H. W. FULLER.
DRILL CHUCK.
APPLICATION FILED JUNE 19, 1909.
964,416.
Patented July 12, 1910.
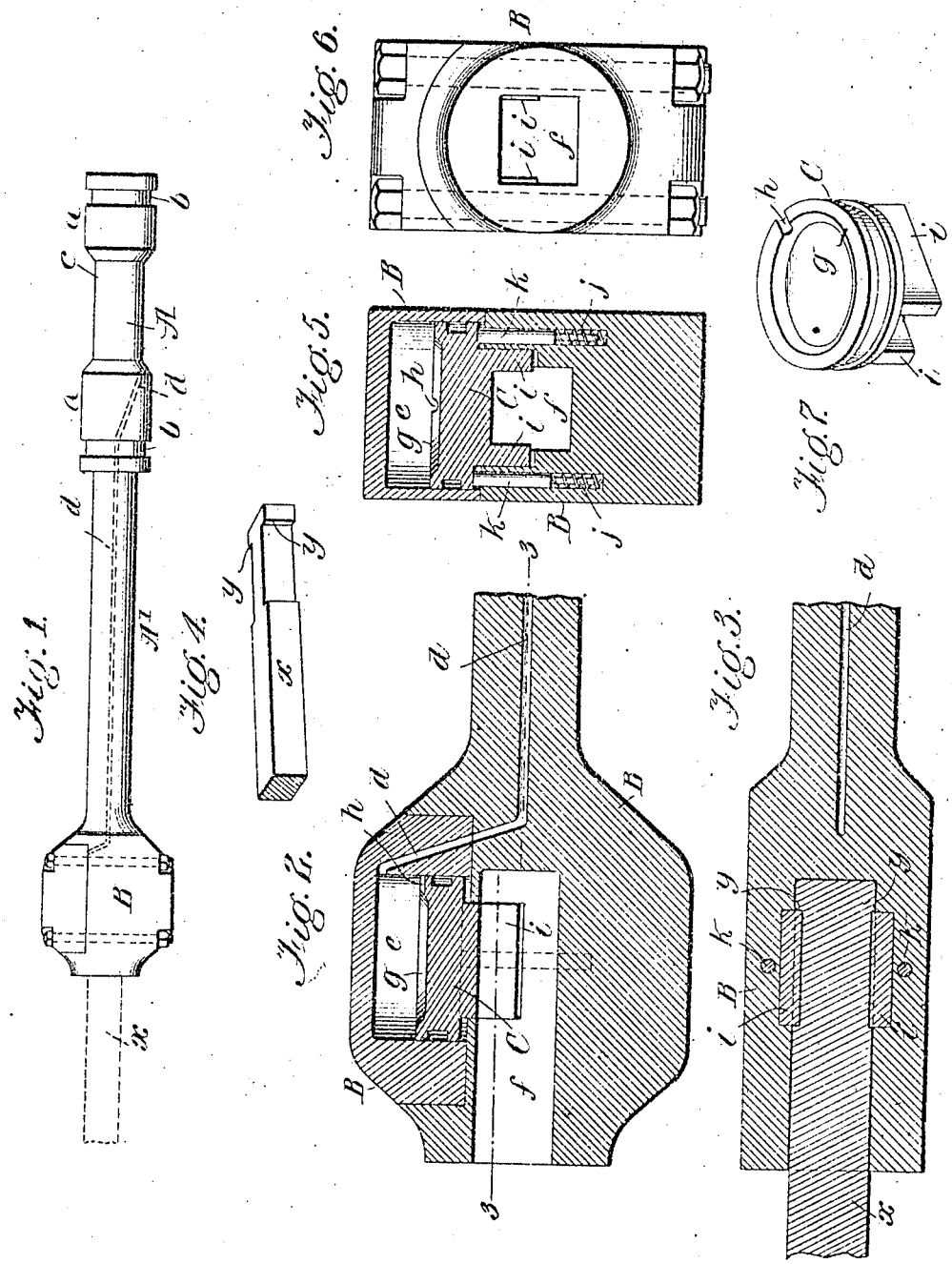
WITNESSES
Samuel E. Wade
Amos W. Hart
INVENTOR
HENRY W. FULLER
BY Munn & Co.
ATTORNEYS

UNITED STATES PATENT OFFICE.

HENRY WALTER FULLER, OF HACHITA, TERRITORY OF NEW MEXICO, ASSIGNOR OF ONE-FOURTH TO NOAH HAYDON, ONE-FOURTH TO A. E. TRIMBLE, AND ONE-FOURTH TO OTTO F. HEER, ALL OF HACHITA, TERRITORY OF NEW MEXICO.

DRILL-CHUCK.

964,416.   Specification of Letters Patent.   Patented July 12, 1910.

Application filed June 19, 1909. Serial No. 503,086.

*To all whom it may concern:*

Be it known that I, HENRY W. FULLER, a citizen of the United States, residing at Hachita, Grant county, Territory of New Mexico, have invented an Improvement in Drill-Chucks, of which the following is a specification.

My invention is an improvement in that class of drill-chucks in which a piston is actuated by steam or compressed air. The drill is usually connected with the piston by means of a device in the nature of a clamp.

The object of my invention is to effect this result by substituting a device operated by air or steam pressure, the piston being provided with a longitudinal passage for conducting the fluid to the chest or cylinder in which the piston reciprocates, such fluid acting upon a movable chuck or clamp arranged in the outer end of the piston, whereby when subjected to pressure it fastens the drill, and when pressure is removed, the drill is in turn released.

The details of construction, arrangement, combination and operation of parts are as hereinafter described and illustrated in the accompanying drawing in which—

Figure 1 is a side view of the piston rod and chuck-head in which the drill proper is secured. Fig. 2 is an enlarged longitudinal section of the chuck-head or outer end of the piston in which the drill is secured. Fig. 3 is a longitudinal section on the line 3—3 of Fig. 2. Fig. 4 is a perspective view of the drill-head. Fig. 5 is a cross section of the chuck-head taken through the center of the latter. Fig. 6 is an end view of the chuck-head. Fig. 7 is a perspective view of the drill clamp or chuck.

Referring in the first instance to Fig. 1, A indicates a piston having two heads $a$ which are provided with circumferential grooves $b$ for receiving packing. The piston is cut away or reduced in diameter at $c$ between the heads $a$ whereby a chamber is provided for constant access of air or steam. From this part $c$, a passage $d$ leads through the piston rod A' to the chamber $e$ formed in the enlarged outer end of the same which portion, for convenience of description, I term a chuck-head, since it is provided with a cavity $f$ to receive the drill $x$, see Figs. 1, 2, 3. The chamber $e$ is preferably cylindrical and in it is arranged the head of the drill clamp or chuck C. This is provided with a circumferential groove to receive packing and the outer side of the same is dished or chambered as shown at $g$, Fig. 2, and also with a notch or groove $h$ which provides for entrance of air or steam in the chamber $e$ even when the clamp or chuck is in contact with the outer wall of the chamber. As shown best in Figs. 4 and 7, the chuck C is provided on its inner side with two parallel wings or jaws $i$ which embrace the sides of the drill-head and engage shoulders $y$ thereof as shown in Figs. 3 and 4. As shown in Figs. 3 and 5, the space between the jaws $i$ of the chuck is less than the diameter of the drill-head, and further, the said jaws are arranged in mortises or recesses formed in the inner side of the socket $f$. Thus while the jaws $i$ engage the shoulders of the drill they also engage the shoulders of the chuck-head. It is obvious that when the clamp or chuck C is in the position indicated in Figs. 2, 3, 4, the drill will be held in the socket $f$ of the chuck-head, and such position of the chuck will be maintained so long as there is due air or steam pressure on the chamber $g$ of the truck. The air or steam for this purpose is preferably supplied from a different source than that required for operating, *i. e.*, reciprocating the piston. It will be understood, however, that the air or steam passing through the duct $d$ is admitted independently of the air or steam applied to the piston, and the same may be cut off or admitted at any time whether the piston reciprocates or not; for this purpose the pipe 5 is provided which takes its supply of air or steam in front of the stop valve 3 that admits the fluid to the piston, and, therefore, air or steam will always pass through the duct $d$, unless shut off by the three-way cock 8 provided for this purpose. The stop valve 3 serves only to cut off or admit air or steam to operate the piston and has nothing to do with the fluid for tightening the drill in the chuck-head.

When the chuck C is relieved of air or steam pressure, it is raised out of engagement with the drill $x$ by means of coiled springs $j$, which as shown in Fig. 5, are arranged in sockets formed in the chuck-head B and beneath slidable stems $k$ whose outer ends bear on the enlarged head of the chuck C. Thus when air or steam is admitted to the chamber e of the chuck-head, its pressure overcomes the tension of the springs j which are then compressed, but when air or steam pressure is relieved the resiliency of the springs j forces the chuck C outward far enough to disengage it from the drill.

What I claim is:

1. The combination with a piston rod provided with an air or steam passage and a chuck-head forming the enlarged outer end of the piston, the same being provided with a drill socket and a lateral chamber with which said passage communicates, a drill-chuck arranged in said chamber and provided on its inner side with parallel jaws for engaging the head of a drill, its outer side being chambered and provided with a peripheral notch for admission of air or steam, as shown and described.

2. The combination, with a piston and chuck-head formed thereon and provided with a drill socket, said piston and chuck head having a fluid passage and a lateral chamber e communicating with said passage, of a drill fastening consisting of a device that is movable laterally in the chamber of the chuck-head and wherein it is subjected to pressure of the fluid, the drill fastening being provided with jaws for engaging the drill-head when projected into the drill socket, as shown and described.

HENRY WALTER FULLER.

Witnesses:
 JOSEPH R. LE DUK,
 CLAUDE E. LAW.